United States Patent Office 3,432,496
Patented Mar. 11, 1969

3,432,496
ALKYL ALKENYL ARSINIC ACIDS
AND SALTS THEREOF
Max Eugene Chiddix, Easton, Pa., assignor to GAF
Corporation, a corporation of Delaware
No Drawing. Filed May 19, 1966, Ser. No. 551,240
U.S. Cl. 260—242  3 Claims
Int. Cl. C07f 9/72; A01n 9/24

This invention relates to novel arsinic acid compounds having improved herbicidal activity.

Novel arsinic acid compounds falling within the purview of this invention are those having the general formula:

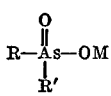

wherein R represents an alkyl radical, R' represents an unsaturated alkyl radical and M represents a member selected from the group consisting of hydrogen and a salt forming moiety.

More particularly, our invention pertains to arsinic acid derivatives of alkyl alkenyl arsinic acid compounds useful as herbicides and having the general formula:

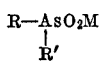

wherein R represents a lower alkyl radical, such as methyl, ethyl, propyl and butyl; wherein R' represents an alkenyl radical, such as allyl and 2-butenyl, and M represents a member selected from the group consisting of hydrogen, an alkali metal, such as sodium, potassium, etc., an alkaline earth metal such as magnesium, calcium, barium, etc., an ammonium ion ($NH_4+$), and an amine salt such as a moiety from an amine such as methylamine, trimethylamine, triethylamine, ethanolamine, dibutylamine, ethylene diamine, morpholine, pyridine and the like.

Certain arsenic compounds have found use as herbicides (U.S. 3,130,035). However, we have discovered a new, unobvious class of compounds having an exceptionally high and unexpected degree of effectiveness in their herbicidal activity. The above free acids and their salts are useful as herbicides and in particular as weed killers and defolaints. In a living plant, because of the effect of buffer salts the arsinic acid undoubtedly is converted to a salt during translocation. Moreover, the arsinic acids of this invention form double salts with rare earth chlorides, nitrates and sulfates, and hence, are also useful in the purification of rare earths.

The arsinic acid compounds of this invention are useful against all types of weeds and plants, including decidous trees, vines, broadleaf plants, cereals, cotton, beans, and peas and may be applied at a rate equivalent to about between 0.1 pound to about 10 pounds per acre. Furthermore, it is immaterial as to how the subject arsinic compounds are applied, since applicants know of no reason that would bar their use by any known method.

Novel compounds of the instant invention may be prepared by reacting the salts of various arsenite compounds with an alkenyl halide such as allyl bromide or 2-butenyl halide to form the arsinic acid salt which may be readily acidified to produce the corresponding free acids as illustrated by the following reaction:

(1)

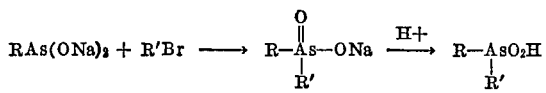

wherein R is a methyl, ethyl, propyl or butyl radical and R' is an unsaturated alkyl radical, such as allyl and 2-butenyl.

The intermediate alkyl starting materials used in the preparation of the subject compounds may be prepared according to the following known reactions:

(2) $As(ONa)_3 + RX \rightarrow RAsO(ONa)_2$ (3) $RasO(ONa)_2 + HCl + SO_2 \rightarrow RAsCl_2$ (4) $RAsCl_2 + NaOH \rightarrow Ras(ONa)_2$ In the above reactions, 2 to 4, R represents an alkyl radical and X represents a halogen, such as chlorine and bromine. Said reactions may be found more fully described in J. Am. Chem. Soc., 44, pages 805 and 1356, (1922).

It is obvious from reaction 1, depicted above, that an alkali metal salt of the arsinic acid is formed first and that the free acid can be obtained by acidification. Other salts, such as alkaline earth metal salts, the ammonium salt, an amine salt or other alkali metal salts may be prepared by neutralizing the free acid with the corresponding base. This does not depart from the scope of the instant invention, since the salt is merely a matter of choice.

As examples of the various alkali metal arylarsenite starting materials there may be mentioned sodium phenylarsenite, sodium o-, m-, p-chlorophenylarsenite, sodium o-, m-, p-methoxyphenylarsenite, potassium phenylarsenite, potassium o-, m-, and p-methoxyphenylarsenite, and the like.

Examples of various bases which may be used to neutralize the arsinic acids are as follows: calcium hydroxide, calcium carbonate, magnesium hydroxide, barium hydroxide, lithium hydroxide, ammonium hydroxide, trimethylamine, triethylamine, methylamine, dimethylamine, ethanolamine, diethanolamine, triethanolamine, ethylene diamine, morpholine, piperadine, pyridine imidazoline, and quinoline.

In order to demonstrate the exceptional herbicidal activity of the instant subject compounds, we have performed the following test.

In a spray cabinet of Plexiglas having a bottom area of three square feet were placed pots containing plants of broadleaf species, i.e., Black Valentine Bean, Heavenly Blue Morning-glory, Scarlet Globe Radish and Lincoln Soybean, along with cereal species, i.e., Clinton Oats and Rice, P.I. 8970. A spray solution was made up by dissolving 34 mg. of the test compound in 12.5 ml. of acetone containing 0.5% Tween 20. Seven days after planting, 12 ml. of the spray solution were vertically directed evenly over the three square feet of area and on to the potted seedlings at a spray rate equivalent to 1 pound per acre. The spray was applied to twelve pots simultaneously (two pots of each species). Visual observations were then made of four plants of each broadleaf species (two plants per pot) and twenty plants of each cereal species (10 plants per pot). Said observations were made at intervals of two days; five days and ten to fourteen days after treatment.

The various test compounds were given a rating of from 1 to 4 with regard to their herbicidal activity on each plant and cereal species tested. A rating of 1 indicates no discernable herbicidal activity. A rating of 2 indicates a slight, but not marked herbicidal effect. A rating of 3 indicates moderate or considerable injury to plant tissues. A rating of 4 indicates marked herbicidal activity characterized by killing or severe necrosis, defoliation, or other effects, which might lead to death before maturity. The maximum rating for one species at one rate over all observed effects is 4. Thus, the highest rating for one rate of application on all the plant species tested is 24 (a total of 4 for each of the six plant species rated).

Conversely, a rating of 6 indicates no visible effect. Those compounds which receive a rating of 10 or above are fairly active; a rating of 12 to 17 is indicative of good activity, while a rating of 18 to 24 is evidence of very high activity.

Further advantages are illustrated, but are not to be construed as limited, by the following examples.

Example I.—Allyl propyl arsinic acid

Propyl arsinic acid and propyl dichloroarsine were prepared by the method disclosed in J. Am. Chem. Soc. 44, page 805 (1922).

Sixty-four grams (0.34 mole) of propyl dichloroarsine were added to 175 ml. of 10 N NaOH at room temperature. The resulting solution was cooled to 15° C., and 62.5 grams (0.5 mole) of allyl bromide were added at a rate to maintain the reaction temperature below 30° C. The solution was refluxed for 2.5 hours and an additional half mole of allyl bromide was added. After standing overnight the reaction solution was refluxed for two hours, cooled to room temperature and several grams of precipitated salts removed by filtration. The filtrate was extracted with benzene to remove excess allyl bromide, neutralized with concentrated HCl, filtered and concentrated to one-half volume. It was filtered again and the pH of this filtrate adjusted to 3.5. At this pH, an oil separated from the solution. The oil was separated from the aqueous layer, dried and refrigerated. A small amount of crystallization occurred after eight days, but attempts to separate the crystals from the remaining oil were unsuccessful. The material was then dissolved in 20 ml. of methanol and purified by passage through the free acid form of an ion-exchange resin (IR-120H+). The final product was obtained by concentration of the effluent. One crystallization from a methanol-ether solution in a Dry Ice-isopropanol bath yielded 10 grams of white powder.

This allyl propyl arsinic acid had a melting point of 91°–95° C. and was soluble in water, acetone or alcohol. It may be represented by the formula:

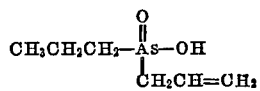

Said arsinic acid compound had a herbicidal activity rating of 23, when evaluated at a rate of one pound per acre according to the test procedure described above. It also caused complete defoliation of the Black Valentine Beans used in the test.

Like results may be obtained by following the method outlined above and substituting either methyl dichloroarsine, ethyl dichloroarsine, or butyl dichloroarsine for the above propyl dichloroarsine to produce the corresponding allyl methyl arsinic acid, allyl ethyl arsinic acid or allyl butyl arsinic acid, or by substituting 2-butenyl bromide for the above allyl bromide to produce 2-butenyl propyl arsinic acid.

Various modifications and variations of this invention will be obvious to a worker skilled in the art.

I claim:

1. Alkyl alkenyl arsinic acid compounds having the general formula:

wherein R represents a lower alkyl radical, R' represents a member selected from the group consisting of hydrogen and a methyl radical and M represents a member selected from the group consisting of hydrogen, an alkali metal, an alkaline earth metal, an ammonium ion and an amine salt moiety.

2. Alkyl alkenyl arsinic acid compounds according to claim 1, wherein R' represents hydrogen.

3. Alkyl alkenyl arsinic acid compounds according to claim 1, wherein R represents a propyl radical and R' represents hydrogen.

References Cited

UNITED STATES PATENTS

| | | | |
|---|---|---|---|
| 2,312,207 | 2/1943 | Clayton et al. | 260—440 X |
| 2,346,155 | 4/1944 | Denison et al. | 260—440 X |
| 2,701,812 | 2/1955 | Takahash et al. | 260—440 |
| 3,322,805 | 5/1967 | Schanhals | 260—440 |

HELEN M. McCARTHY, *Primary Examiner.*

W. F. W. BELLAMY, *Assistant Examiner.*

U.S. Cl. X.R.

260—440, 271; 71—82, 83, 97